Figures 1, 2:
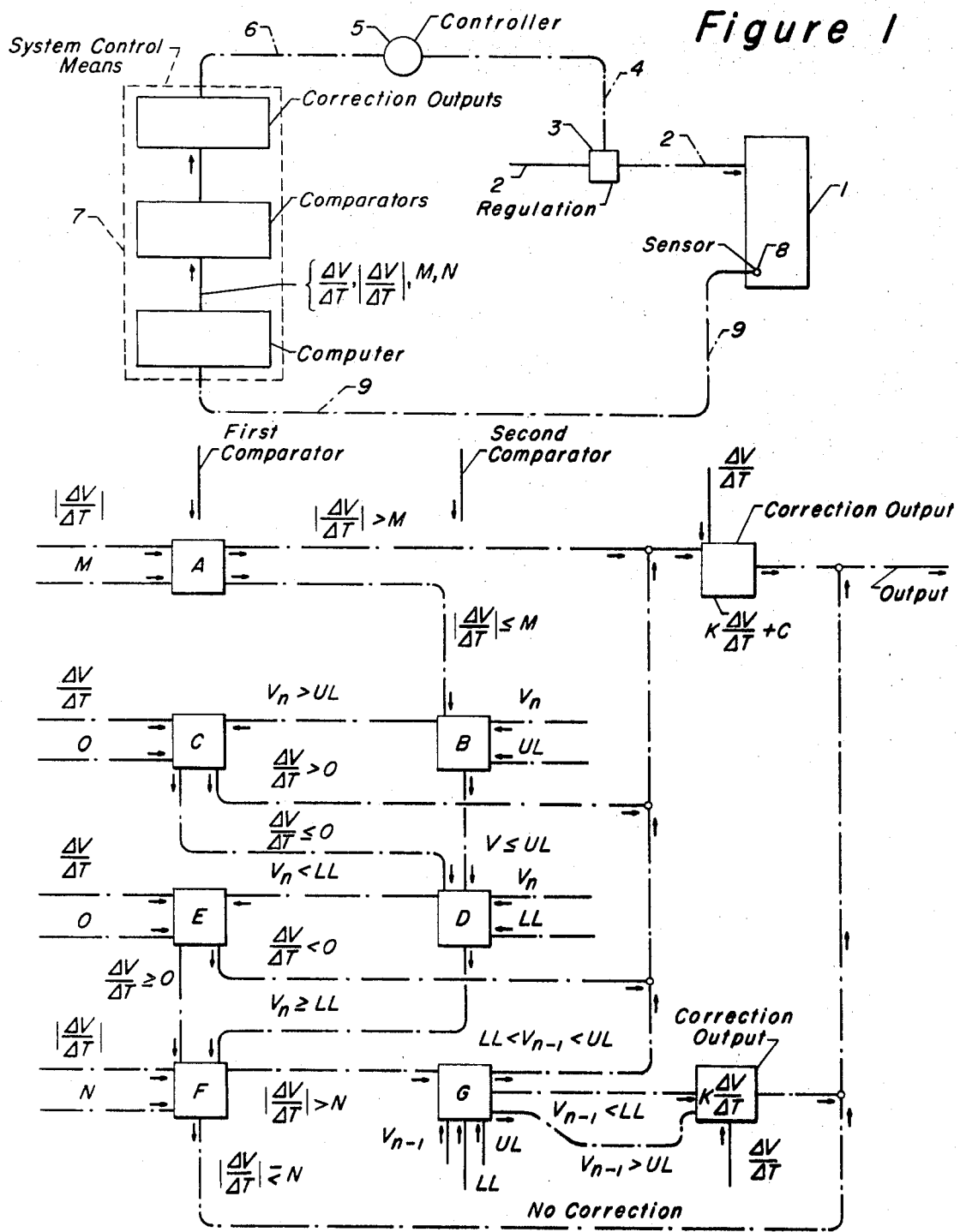

United States Patent [19]

Sayles et al.

[11] 3,761,690

[45] Sept. 25, 1973

[54] COMPUTER CONTROL OF A PHYSICAL SYSTEM IN WHICH THE MAGNITUDE AND FREQUENCY OF CORRECTIONS ARE SYSTEM DEPENDENT

[75] Inventors: John H. Sayles, Arlington Heights; Allen L. Pekar, Brookfield, both of Ill.

[73] Assignee: Universal Oil Products Company, Des Plaines, Ill.

[22] Filed: July 6, 1971

[21] Appl. No.: 160,022

[52] U.S. Cl. ............................................ 235/150.1
[51] Int. Cl. ............................................ G05b 11/36
[58] Field of Search .................... 235/150.1, 151.12, 235/151.1; 318/609, 610

[56] References Cited
UNITED STATES PATENTS
3,582,629  6/1971  Ross ................................. 235/151.1

*Primary Examiner*—Eugene G. Botz
*Attorney*—James R. Hoatson, Jr. et al.

[57] ABSTRACT

A control system for a physical system which includes a chamber wherein the value of a desired property of the system is to be maintained within predetermined limits of deviation. There is provided regulating means connected to the chamber for regulating the value of the desired property and control means connected to said regulating means for controlling such regulation. Sensing means such as level indication devices, pressure indicating devices, temperature indicating devices, or the like, is connected to the chamber for generating a signal representative of the aforesaid value of said desired property. System control means is connected to the sensor and to the control means for receiving the signals and for generating signals for controlling said system. The system control means includes computer means for computing the change of the value of the desired property with respect to time and for determining a parameter of comparison whose value is a function of the value of said desired property. First comparator means is provided for comparing the rate of the change of the desired property with the parameter of comparison and for activating the control means in response to the comparison. Second comparator means is provided for comparing the actual value of the desired property with limits of deviation and for determining the time at which to activate the control means in response to that comparison.

10 Claims, 4 Drawing Figures

COMPUTER CONTROL OF A PHYSICAL SYSTEM IN WHICH THE MAGNITUDE AND FREQUENCY OF CORRECTIONS ARE SYSTEM DEPENDENT

This present invention relates to an improved control system for a physical system wherein the value of a desired property of the system is to be maintained within predetermined limits of deviation. Particular applicable systems include chemical, petrochemical, and petroleum refining applications, for example: wherein the level of material within a chamber is to be maintained within predetermined limits, wherein the pressure within the chamber is to be maintained within predetermined limits, wherein the chemical composition of the contents of a chamber is to be maintained within predetermined limits, wherein the temperature of the materials within a chamber is to be maintained within predetermined limits, wherein the rate of change of a desired property is to be maintained within predetermined limits, and the like.

BACKGROUND OF THE INVENTION

In chemical, petrochemical, and petroleum refining industries, sophisticated control systems are widely used to govern efficiency, production, and reactant consumption in processes such as catalytic conversion, thermocracking, and the like. Typical control in many refinery operating units is often accomplished by using a controller wherein the control mechanism generates a correction linearly proportional to the difference of the actual value of the property and the desired value or set point of that property. This type of control mechanism is commonly referred to as a "proportional" controller. Other types of controllers incorporate mechanisms which include proportional plus differential, proportional plus integral, and proportional plus integral plus differential controllers. In the proportional plus differential controller, the output correction generated is proportional to the difference between the actual value of the property and the desired value and in addition is also proportional to the rate of change of the value of the desired property. In the proportional plus integral type of controller, the output correction generated is proportional again to the difference between the actual value of and the desired value and in addition to the integral of the error.

The need for and the use of the various types of control functions, i.e., proportional, integral and derivative, is well known to those skilled in the art. The derivative function is particularly useful in those situations where time lags exist in the system due to transport of material, thermal inertia, etc.

While controllers commonly exist which incorporate proportional only, proportional plus derivative, proportional plus integral and integral only mechanisms, it has been heretofore impractical to use a controller which contains the derivative function only and whose corrective output is proportional only to the derivative of the error function. The reason for this is that with a derivative mechanism only, no output correction is generated when the rate of change of desired property is equal to zero, even if the desired property's current value is exceedingly distant from the set point.

The heretofore common solution to this problem has been to sum the derivative with an additional correction i.e., the proportional correction. This is not always satisfactory since in systems with considerable time lag, the proportional correction addition can cause instability in the control system.

With the advent of digital computing equipment, it is now possible to use the desirable derivative function alone and in the rare instance when the derivative equals zero, the derivative sensing function will still issue corrections, the timing of which is based on the past and present history of the desired value.

A typical problem that occurs with prior art control schemes is that in large installations with erratic supplies of reactants and with considerable lag times in the effect of any changes in the supply of reactants, the use of any of the proportional, proportional plus integral, etc. control modes in a "feed-back" control system is generally only marginally adequate.

SUMMARY OF THE INVENTION

Thus it is a principal object of this invention to provide a control system for a physical system wherein the value of a desired property of the system is to be maintained within predetermined limits of deviation.

More particularly, it is an object of this invention to provide for a control system for a physical system which does not continuously make corrections in output, but only makes corrections when the rate of change of a desired property exceeds a parameter of comparison which varies with the value of the desired property or if the value is beyond predetermined limits of deviation and is continuing to depart from such limits.

Thus, in a broad aspect the present invention provides for a control system for a physical system including a chamber wherein the value of a desired property of the system is to be maintained within predetermined limits of deviation which comprises: (a) regulating means connected to said chamber for regulating the value of said desired property therein; (b) control means connected to said regulating means for controlling said regulation; (c) sensing means connected to said chamber for generating a signal representative of the aforesaid value of said desired property; and, (d) system control means connected to said sensing means and to said control means for receiving said signal and for generating signals for controlling said system, said system control means including: (1) computer means for computing the change of the value of said desired property with respect to time and for determining a parameter of comparison whose value is a function of the value of said desired property; (2) first comparator means for comparing the rate of change of the desired property with said parameter of comparison and for activating said control means in response to said comparison; and (3) second comparator means for comparing the actual value of the desired property with the limits of deviation and for activating said control means in response to said comparison.

Typical applications of the present control system are for example controlling the level of a vessel such as a fractionator. Another example is controlling the temperature difference across a catalyst reactor. Other examples include controlling the pressure in a reactor chamber, or controlling the rate of change of the chemical composition of a reactor effluent.

Preferably, when the value of the desired property lies beyond the predetermined limits and when the computed change of the value of the desired property with respect to time indicates that the value will continue to depart from such limits, the comparator means, i.e., the first comparator and the second comparator, will activate said control means to alter the rate of change of the value of the desired property, the alteration being proportional to the computed change of the desired property with respect to time. A constant can be added to turn the trend of values and not merely level it out. It is noted that this decision to make a correction is not made unless the value is outside of the limits.

The parameter of comparison will comprise a first variable parameter whose value is given by the absolute value of: the difference between the measured value of the desired property and the more proximate limit; with respect to time:

$$N = |(V-L_p)/\Delta t|$$

where N is the first variable parameter, V is the value of the desired property, $L_p$ is the more proximate limit and $\Delta t$ is an arbitrary time period. When the absolute value of the rate of change of the value of said desired property exceeds this first variable parameter, the first comparator means will activate said control means. If this rate is equal to or less than N the comparator means will not activate the control means unless the value of the desired property lies beyond the limits and the change of the value of the desired property with respect to time indicates that the value will continue to depart from such limits. The magnitude of alteration made by the comparator means is always proportional to the computed change of the value of the desired property with respect to time. It is noted that the magnitude can be variable depending upon the value of the proportionality constant selected. When the value of the desired property lies within the limits, when the absolute value of the change of value of said desired property with respect to time exceeds N, and when the value of the desired property is approaching a more proximate limit, it is desirable that the correction made will reverse the trend of the value of the property. This may be accomplished by adding a constant to the proportional correction component although using different proportionality constants may accomplish the same result.

If the absolute value of the rate of change of the value of the desired property exceeds N a correction will always be made. Preferably, a second variable parameter is used to determine another circumstance when the correction output will insure a trend reversal. The second variable parameter is given by the absolute value of: the difference between the measured value of the desired property and the more distant limit; with respect to time.

$$M = |(V-L_d)/\Delta t|$$

where M is the second variable parameter, V is the measured value of the desired property, $L_d$ is the value of the more distant limit, and $\Delta t$ is an arbitrary time period. When the absolute value of the rate of change of the value of said desired property exceeds M, the output is computed so that a trend reversal occurs.

It is noted that the present invention issues a correction which is only proportional to the rate of change of the desired property. The magnitude of the error between the actual value of the desired property and the desired value (set point) in no way influences the value of the corrective action in the same manner as the "standard" proportional controller.

It is only the fact that an error exists rather than its magnitude which influences the present invention's correction action. Another unique feature of the invention is that, the time sequence in which corrective action is generated by the control mechanism is a variable quantity and is also controlled by the derivative function.

The present invention therefore differs from prior art control systems in that it provides for a correction whose magnitude is proportional only to the rate of change of the value of a desired property, and in addition with control action timing also being a function of the rate of change of the value or the value itself.

The present control system is thus less affected by lag than the proportional only, proportional plus reset etc. type of controller. An additional improvement is the use of the variable parameter which is a function of the instantaneous value of the variable itself. Thus the control system makes correction moves when the rate of change exceeds the variable parameter of comparison. Since the parameter of comparison is always changing in relationship to the value of the desired property the system itself determines when a control adjustment is needed. This is obviously an improvement over a fixed time interval to make corrections. It also will make moves when the value is beyond predetermined limits of deviation and is continuing to depart from such limits. Thus, the essence of the present invention is the use of the derivative function to accomplish both the magnitude and timing of the correction as determined by a function of the instantaneous value of the desired property.

Although the broad embodiment of this invention may utilize analogue means to generate the timing as well as the type of correction, digital means is also contemplated. In a preferred embodiment of the control system the computer means is a digital computer having scanning means for scanning signals at predetermined intervals of time and having differentiating means for computing the change of the value of said desired property with respect to a predetermined time increment corresponding to at least one of the time intervals and also has storage means for storing the values of the desired property. Since there may be a surge in the value at various intervals of time it is also contemplated to be within the scope of this invention to provide filtering means or averaging means to compute the change of the value of the desired property with respect to time which is more indicative of the long term trend of the performance of the particular physical system. The use of averaging or filtering means is of course also possible when utilizing an analogue system. Such averaging or filtering means is well known in the art. When time intervals and time increments are used with a digital embodiment, the first variable parameter may be computed to be the absolute value of: the difference between the measured value or filtered or averaged of the desired property and the more proximate limit; divided by a predetermined time increment:

$$N = |(V-L_p)/\Delta t|$$

When the absolute value of the computed change of the value of the desired property with respect to this predetermined time increment exceeds the first variable parameter, the first comparator means will activate the control means. If the change of value of the desired property with respect to a predetermined time increment is compared with a parameter which is also calculated with respect to the same predetermined time increment, the comparator means may be set up to compare the linear distances involved, without considering the time increments, since they are the same. It is noted that it is not necessary that these time increments be equal in both cases. As was the case in the broad embodiments, the alteration made by the comparator means is made proportional to the computed change of the value of the desired property with respect to the predetermined time increment. A constant can be added to this proportional correction factor under certain circumstances when a reversal trend is desired as previously described. One of these circumstances is when the value at the present time increment lies within limits and when the value of the desired property at the last predetermined time increment was also within the limits. Then when the computed change of the value of the desired property with respect to the predetermined time increments exceeds the first parameter the comparator will actuate the control means to alter the rate of change of the desired property, the alteration being proportional to the computed change of the value of said desired property with respect to the time increment plus a constant:

$$\text{Alteration} = K(\Delta v/\Delta t) + c$$

Note by using a different proportionality constant K for a reversal of trend situation, c may be eliminated. If the computed change of the value of the desired property at the present time increment lies beyond the limits, and if the computed change of the desired property with respect to the time increment indicates that the value of the desired property will continue to depart from the limits, a correctional output is computed to effect trend reversal. Another instance is when reverse of trend is needed when the computed change of the value of the desired property with respect to the time increment exceeds a second variable parameter. The second variable parameter is computed by the computer means and is equal to the absolute value of: the difference between the measured value of the desired property and the more distant limit; divided by the predetermined time increment:

$$M = \left| V - L_d / \Delta t \right|$$

Where V is the measured value of the desired property, $L_d$ is the more distant limit and $\Delta t$ is the time increment.

Reference to the accompanying drawing and the following description thereof will serve to illustrate with more clarity the present invention as well as set forth additional advantageous features in connection therewith.

FIG. 1 of the drawing is a schematical illustration of a physical system utilizing the control system of the present invention.

FIG. 2 of the drawing is a block flow diagram of one embodiment of the control system of the present invention.

Figure 3:
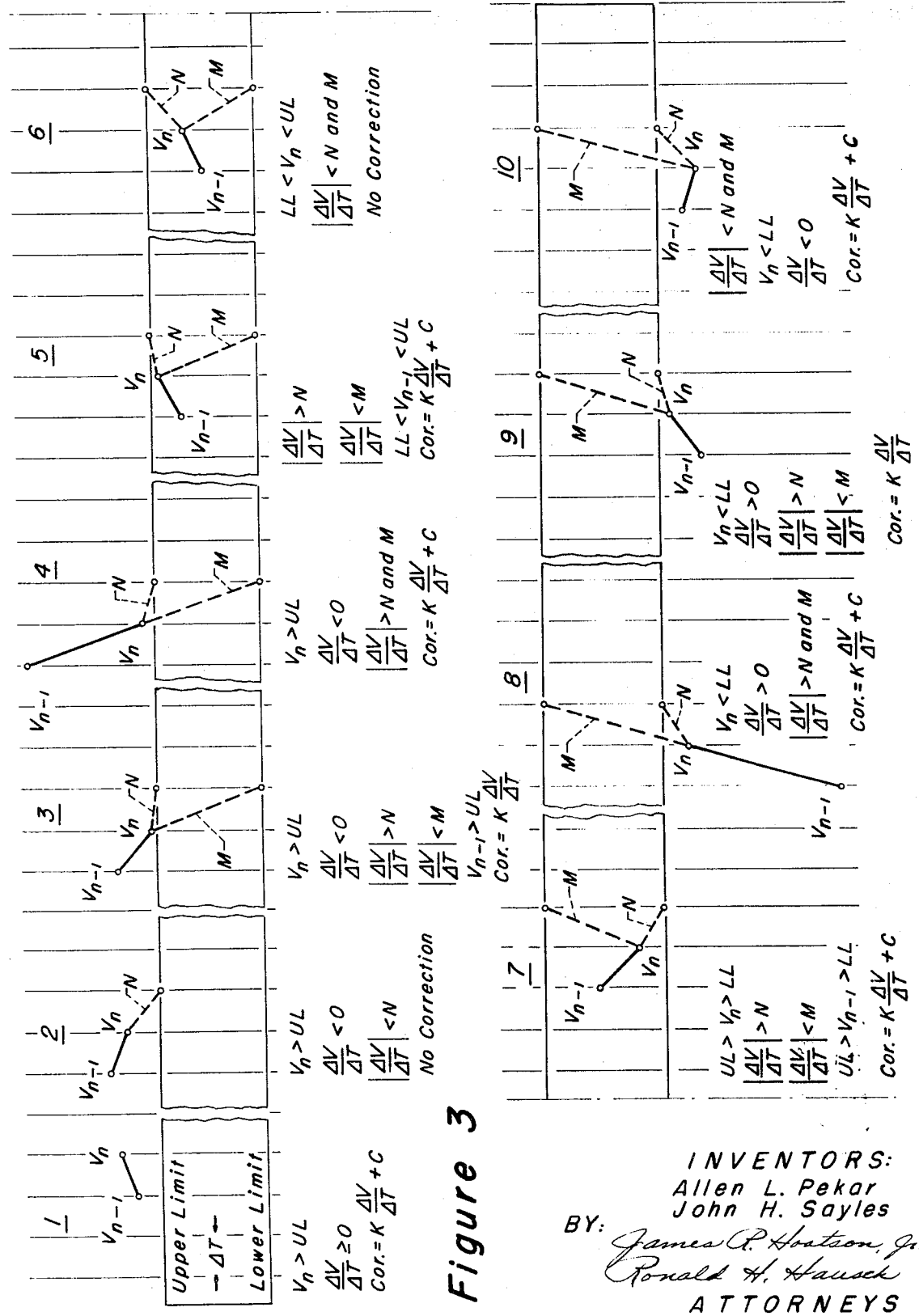

FIG. 3 of the drawing shows schematically a series of curves which represent the changing value of a desired product and the moves which will be made by the control system of this present invention.

Figure 4:
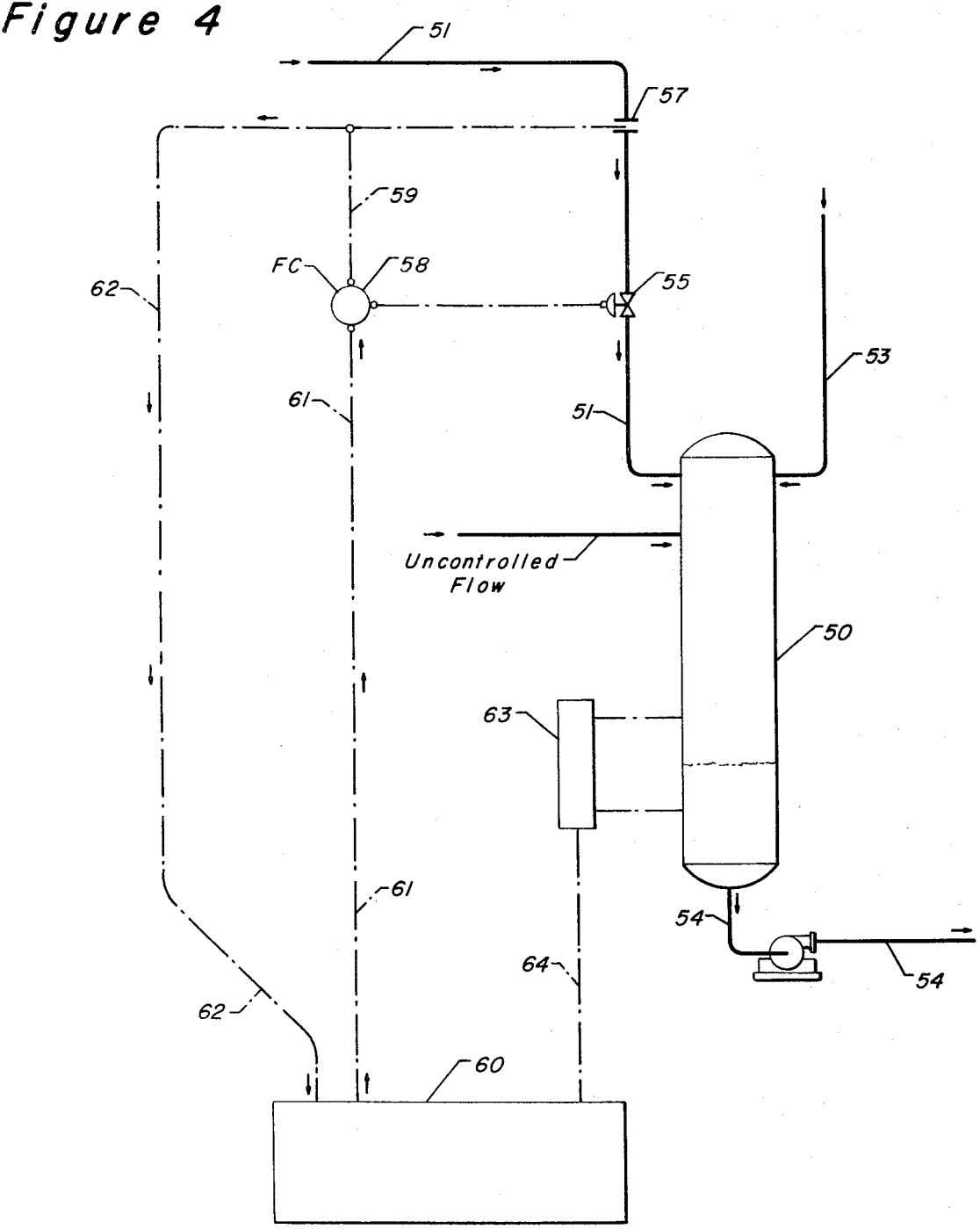

FIG. 4 of the drawing is a schematical illustration of a specific embodiment of a physical system wherein a level is to be maintained within predetermined limits.

Reference is now made to FIG. 1 of the drawing where there is shown a chamber 1 having inlet means 2 which is connected to regulation means 3 for regulating the value of a desired property within the vessel or chamber 1. The regulation means may comprise a control valve in a conduit 2 for introducing varied amounts of effluent into the chamber 1. On the other hand it may comprise a heat exchanger for regulating the heat input into a fluid of conduit 2. Other examples of regulation means 3 may include pumps, burners, electrical resistance elements, and the like. The type of regulating means will of course depend on the type of property the control system of this invention is designed to control and such regulation will be apparent to those skilled in the art. Connected to the regulation means 3 via transmitting line 4 is a controller 5 having a regulatable or adjustable set point. The controller is connected to the system control means 7 via transmitting lines 6. Also connected to the chamber is a sensor 8 which may be temperature sensor, level sensor, or the like. The sensor 8 is connected to the system control means via transmitting line 9. The system control means 7 may be analogue in nature, mixed digital and analogue, or completely digital. The system control means 7 comprises a computer, comparators and correction output means. The comparator and correction output logic is described below in connection with FIG. 2. The computer determines the change of value of the desired property with respect to time, i.e., $\Delta V/\Delta T$ or absolute value thereof. It also generates parameters of comparison M, N, which are functions of the desired property.

The parameter of comparison omprises a first variable parameter whose value is given by the following formula:

$$N = \left| V - V_p / \Delta t \right|$$

When the absolute value of the rate of change of the value of the desired property exceeds the first parameter, the comparator means will activate the control means. The alteration made under this circumstance is proportional to the computed change of the value of the desired property with respect to time. However, as set out hereinbefore, when the value of the desired property lies within the limits and when the value of the desired property is approaching the more proximate limit the correction will be computed so that a trend reversal occurs. The parameter of comparison may further comprise a second variable parameter whose value is given by the absolute value of: the difference between the measured value of the desired property and the more distant limit; with respect to time.

$$M = \left| V - V_d / \Delta t \right|$$

When the absolute value of the rate change of the value of said desired property exceeds the second variable parameter, the correction will also be computed so that a trend reversal occurs.

Preferably the system control means will comprise a digital computer which will receive a signal from the sensor, convert it to digital components and after determining proper signals for control, convert them back to the analogue signals for use by the controller means 5. The digital computer will comprise clock means located therein that will periodically scan the incoming signals from line 9 at predetermined intervals of time. The computer will comprise differentiating means for computing the change of the value of the desired property with respect to a predetermined time increment corresponding to at least one of the time intervals it scans. It will also have storage means for storing values of the desired property as well as the values of predetermined limits.

A typical flow sheet for the control system of this invention is shown in FIG. 2 of the drawing. The letter N corresponds to the first variable parameter whose value is equal to the absolute value of the difference between the measured value of the desired property and the more proximate limit; divided by the predetermined time increment. The letter M corresponds to the second variable parameter whose value is computed to be equal to the absolute value of the difference between the measured value of the desired property and the more distant limit; divided by the predetermined time increment. $\Delta V/\Delta t$ is a change of the value of the desired property with respect to the time increment. LL corresponds to the lower limit, UL corresponds to the upper limit. $V_n$ and $V_{n-1}$ correspond to the values of the desired property at the present time and at the time one increment earlier respectively. K is an arbitrary constant of proportionality. C is an amount to effect reversal. Reversal may also be effected by varying the proportionality constant. It is assumed that the computer has already calculated N, M, $\Delta V/\Delta t$ and has stored the quantities of $V_n$ and $V_{n-1}$ as well as the lower limit LL and the upper limit UL and other information necessary to make decisions.

Referring to block A of FIG. 2 it is seen that the input of the absolute value of $\Delta V/\Delta t$ and the input M are compared in a circuit of the first comparator. If the absolute value of $\Delta V/\Delta t$ is greater than M, the comparator will allow the generation of a correction signal proportional to $\Delta V/\Delta t$ plus the constant which will help turn around the process. If the absolute value of $\Delta V/\Delta t$ is less than or equal to M the logical flow will go to block B of the second comparator where $V_n$ is compared with the upper limit UL. If $V_n$ is greater than UL the logical step is to see if $\Delta V/\Delta t$ is increasing, which is done in block C of the first comparator by the comparison of $\Delta V/\Delta t$ with zero. If $\Delta V/\Delta t$ is equal to or greater than zero the comparator means allows the generation of a correction signal proportional to $\Delta V/\Delta t$ plus a constant. If $\Delta V/\Delta t$ is less than zero then the next logical step is block D. Also if $V_n$ is less than or equal to the upper limit the next logical step is block D of the second comparator where $V_n$ is compared with the lower limit LL. If $V_n$ is less than the lower limit the logical step is block E of the first comparator where $\Delta V/\Delta t$ is compared with zero again. If $\Delta V/\Delta t$ is equal to or less than zero the comparator means will allow the generation of a signal proportional to $\Delta V/\Delta t$ plus the constant. If $\Delta V/\Delta t$ is greater than zero the next step shown is block F. Also if $V_n$ is greater than or equal to the lower limit LL the next logical step is block F. In block F the absolute value of $\Delta V/\Delta t$ is compared with N; if the absolute value of $\Delta V/\Delta t$ is less than or equal to N no correction is made. If the absolute value of $\Delta V/\Delta t$ is greater than N, the next logical step is shown in block G where $V_{n-1}$ is compared with the lower limits and the upper limits. If $V_{n-1}$ is greater than the lower limit and less than the upper limit the correction is proportional to $\Delta V/\Delta t$ plus a constant. If $V_{n-1}$ is less than the lower limit or greater than the upper limit then the correction is merely proportional to $\Delta V/\Delta t$ which is basically a line out correction.

In FIG. 3 there is shown various curves showing the positions of $V_{n-1}$ and $V_n$ as well as the calculated quantities N and M. It is noted that the slope from $V_{n-1}$ to $V_n$ is equal to $\Delta V/\Delta t$ if the space between the vertical lines is equal to $\Delta t$. It is seen that in example 1, $V_n$ is greater than UL and $\Delta V/\Delta t$ is greater than or equal to zero. Thus, the correction move is proportional to $\Delta V/\Delta t$ plus a constant. In example 2, $V_n$ is greater than LL but $\Delta V/\Delta t$ is less than zero. Furthermore, the absolute value of $\Delta V/\Delta t$ is less than N; therefore no correction is needed. In curve No. 3 it is seen that $V_n$ is greater than UL but $\Delta V/\Delta t$ is less than zero. However, the absolute value of $\Delta V/\Delta t$ is greater than N and therefore a correction output is needed. The absolute value of $\Delta V/\Delta t$, however, is less than M and $V_{n-1}$ is greater than the upper limit therefore the correction is merely proportional to $\Delta V/\Delta t$ which indicates a line out move. In example 4 of FIG. 3 $V_n$ again is greater than the upper limit but $\Delta V/\Delta t$ is less than zero. However, the absolute value of $\Delta V/\Delta t$ is greater than N and M; therefore the correction is proportional to $\Delta V/\Delta t$ plus a constant. in example 5 the absolute value of $\Delta V/\Delta t$ is greater than N and the absolute value of $\Delta V/\Delta t$ is less than M. Typically, this would indicate that the correction should be the line out move without a constant added but $V_{n-1}$ is greater than the lower limit and less than the upper limit and therefore the constant is added to the correction and the correction is proportional to $\Delta V/\Delta t$ plus C. In example 6 the absolute value of $\Delta V/\Delta t$ is less than N and M and $V_n$ is within the limits therefore no correction is made. In example 7 the absolute value of $\Delta V/\Delta t$ is greater than N but less than M and $V_n$ lies within the limits. However, $V_{n-1}$ is also within the limits and therefore the correction is proportional to $\Delta V/\Delta t$ plus the constant. In example 8, $V_n$ is less than the lower limit but $\Delta V/\Delta t$ is greater than zero so no correction is made on this account. However, the absolute value of $\Delta V/\Delta t$ is greater than M and thus greater than N so the correction is proportional to $\Delta V/\Delta t$ plus the constant. In example 9, $V_n$ is less than the lower limit but $\Delta V/\Delta t$ is greater than zero so no correction is made on that account. The absolute value of $\Delta V/\Delta t$ is greater than N but less than M; therefore, the correction is proportional to $\Delta V/\Delta t$ with no turn around constant added. The correction is merely a line out move. In Example 10 the absolute value of $\Delta V/\Delta t$ is less than M and N but $V_n$ is less than the lower limit and $\Delta V/\Delta t$ is less than zero. Therefore a correction is called for proportional to $\Delta V/\Delta t$ plus the turn around constant.

From the foregoing it is seen that the advantage of the present control system is that the correction moves are not made constantly, nor are they made at predetermined intervals of time. The process is allowed to continue without correction unless the absolute value of $\Delta V/\Delta t$ is greater than N or if the value of $V_n$ is beyond the limits and continuing to depart from such limits. Thus, the moves are not merely timed moves but are made only when the value of the desired property or the change of value with respect to time exceeds certain parameters. The correction itself is always proportional to the rate of change of the value. When a turn around is necessary to make the value approach the limits or stay within the limits, a constant is added to the correction signal or a different proportionality constant is utilized.

A typical example of the application of this present control system is in the control of the level of a chamber. Reference is now made to FIG. 4 of the drawing where such a system is shown. Consider the situation where there is a vessel 50 with two major streams entering through inlet 51 and inlet 52 and one stream leaving through outlet 54. The stream through 52 is flow controlled and only flow through 51 can be controlled as an entering stream. The flow through 52 may vary in volume flow rate over a long period of time but for hypothetical purposes it is assumed that we cannot measure this flow and can only determine the variations in level in the vessel 50. It is assumed that the level will vary as a long term cyclic drift, increasing or decreasing with a period of perhaps hours between peaks due to fluctuations in the flow through conduit 52. It may also be assumed that intermittently and unpredictably a small amount of flow is dumped into the vessel through the conduit 53 which causes a pressure surge in the vessel giving a surge to the level in the vessel. Problems which result because of this unique situation arise because of the fixed flow rate in conduit 52, the usual lag time to change level by changing the value of flow through conduit 51, the surges resulting from the dumping through conduit 53 and the variable flow rate through conduit 52. The only way to control the level is by manipulating the flow through conduit 51, since the flow through conduit 52 is unmeasurable and cannot be manipulated. The control system includes a control valve 55 in line 51. A flow sensitive device shown as an orifice 57 is placed in line 51 and connects to a flow controller 58 via transmitting line 59. Flow controller 58 has a regulatable or adjustable set point which is adjusted via the system control means 60 through transmitting line 61. The flow signal from orifice 57 is also transmitted to the system control means 60 via transmitting line 62 so that at every instance of measurement the flow through 51 is always known in the system control means 60. A level measuring device 63 is placed within the vessel and the signal derived from the flow sensing device 63 is transmitted to the system control means 60 via transmitting line 64. The system control means has computer means for computing the change of the value of the level with respect to time and also for determining a parameter of comparison whose value is a function of the value of the level. The system control means also has comparator means for comparing the rate of change of the desired property computed by the computer means with such a parameter of comparison and for activating said control means in response to such comparison. The system control means also has second comparator means for comparing the actual value of the level with the predetermined limits of deviation and for activating the controller in response to said comparison.

Particularly when the level of the desired property lies beyond such limits and when the computed change of level with respect to time indicates that the value will continue to depart from such limits the comparator means will activate said control means to alter the rate. The correction signal is equal to $\Delta F = (-Kl \cdot Kvt \cdot Kg)(dl/dt) + C$ where $\Delta F$ is a required change of flow, $dl/dt$ is the rate of level change per unit time, Kg is a temperature volume correction for process liquids, Kvt converts the change in level over a known time to an equivalent conversion value such as barrels per day, and Kl is the proportionality constant which will depend on the frequency of change known to exist in the particular vessel. C is a constant used in trend reversing situations. (The correction sign (+) or (−) of kl is dependent on whether an inflow or outflow of material or energy from the chamber is controlled.) The parameter of comparison will comprise a first variable parameter whose value is given by the absolute value of the difference between the measured level and the more proximate limit of level with respect to time. When the absolute value of the rate of change of the level exceeds this first variable parameter the comparator means within the system control means will activate said control means. The magnitude of the correction will always be proportional to $dl/dt$. However, when the level lies within the limits and when the change of level with respect to time indicates that the level is approaching the more proximate limit a trend reversing correction is called for. The correction in such a case will again be equal to: $\Delta F = (-Kl \cdot Kvt \cdot Kg)(dl/dt) + C$. In other cases the comparator means will look to a second parameter whose value is given by the absolute value of the difference between the measured level and the more distant limit of level with respect to time. When the rate of change of the value the level exceeds the second variable parameter the correction will again be equal to $\Delta F = (-Kl \cdot Kvt \cdot Kg)(dl/dt) + C$. If $dl/dt$ is greater than the first parameter and less than the second parameter the correction is equal to:

$$\Delta F = (-Kl \cdot Kvt \cdot Kg)(dl/dt)$$

when V is not within the limits nor departing. It is seen that basically when controlling the level of the chamber, decisions are made in the same manner as when controlling any value of any desired property. From this it can be seen that there also may be provided computer means for scanning the signal of level at predetermined intervals of time and differentiating the change of level with respect to a predetermined time increment corresponding to at least one of such intervals. In such a case the parameters of comparison will be the difference between the measured level and the more proximate limit for the first parameter and the difference between the measured level and the more distant limit for the second parameter divided by the predetermined time increment. The other steps are analogous to the discussion relating to FIGS. 1 through 3 of the drawing.

It is evident that the control system of this present invention may be applicable to many utlizations besides that which is illustrated. The desired property may include pressure, chemical composition, rate of change of the level, temperature of the effluent in the chamber, rate of change of the temperature, rate of change of the pressure, rate of change of the composition, and the like. Those skilled in the art will readily see that application of such desired properties may be readily made to the present invention.

We claim as our invention:

1. A control system for a physical system wherein the value of a desired property of the system is to be maintained within predetermined limits of deviation which comprises:

a. control means connected to said physical system for controlling said desired property;

b. sensing means connected to said physical system for generating a signal representative of the aforesaid value of said desired property; and, c. system control means connected to said sensing means and to said control means for receiving said signal and for generating signals for controlling said system, said system control means including:

1. computer means for computing the change of the value of said desired property with respect to time and for determining a parameter of comparison whose value is a function of the value of said desired property;

2. a correction output means generating a signal proportional to the change of value of said desired property with respect to time, said correction output means being coupled with and transmitting said signal to said control means;

3. first comparator means for comparing the rate of change of the desired property with said parameter of comparison and for activating said correction output means in response to said comparison; and 4. second comparator means for comparing the actual value of the desired property with the limits of deviation and for activating said correction output means in response to said comparison.

2. The control system of claim 1 wherein said first comparator means includes means to determine whether the computed change of value of said desired property with respect to time is greater or less than zero, and said correction output means is adapted, in an alternative mode, to generate a signal proportional to the computed change of value of said desired property with respect to time and including a component to reverse the trend of the value, said first and second comparator means cooperating to activate said correction output means in said alternative mode when the value of said desired property lies beyond said limits and when the computed change of value of said desired property with respect to time indicates that said value will continue to depart from said limits.

3. The control system of claim 1 wherein the desired property comprises the level of material.

4. The control system of claim 1 wherein the desired property comprises the temperature of the materials.

5. The control system of claim 1 wherein the desired property comprises the pressure of the material.

6. The control system of claim 1 wherein the desired property comprises the chemical composition of material.

7. The control system of claim 1 wherein the desired property comprises the rate of change of level of material.

8. The control system of claim 1 wherein the desired property comprises the rate of change of temperature of material.

9. The control system of claim 1 wherein the desired property comprises the rate of change of pressure of material.

10. The control system of claim 1 wherein the desired property comprises the rate of change of composition of material.

* * * * *